July 5, 1966  C. A. EDELSTEIN  3,258,879
APPARATUS FOR GRINDING CONTACT LENSES
Filed Nov. 4, 1963  3 Sheets-Sheet 1
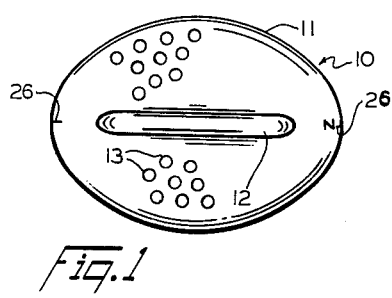
Fig. 1
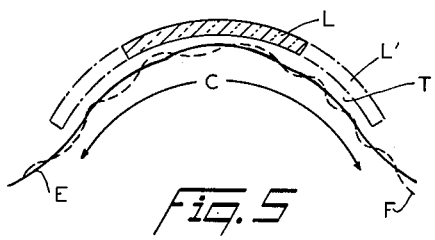
Fig. 5
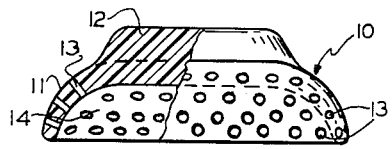
Fig. 2
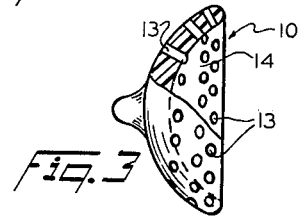
Fig. 3
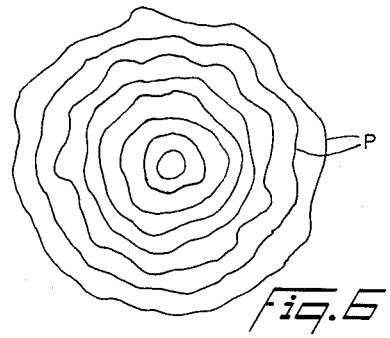
Fig. 6
Fig. 4
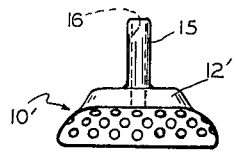
Fig. 7
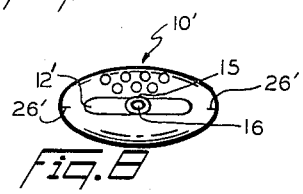
Fig. 8
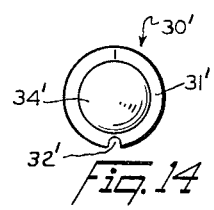
Fig. 14
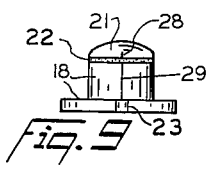
Fig. 9
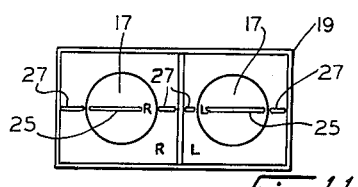
Fig. 11
Fig. 13
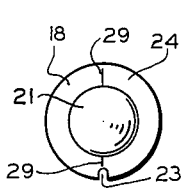
Fig. 10
Fig. 12
INVENTOR.
CARLYLE A. EDELSTEIN
BY Richard von K. Bruns
Atty.

July 5, 1966 C. A. EDELSTEIN 3,258,879
APPARATUS FOR GRINDING CONTACT LENSES
Filed Nov. 4, 1963 3 Sheets-Sheet 2
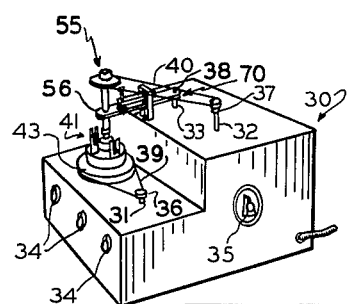
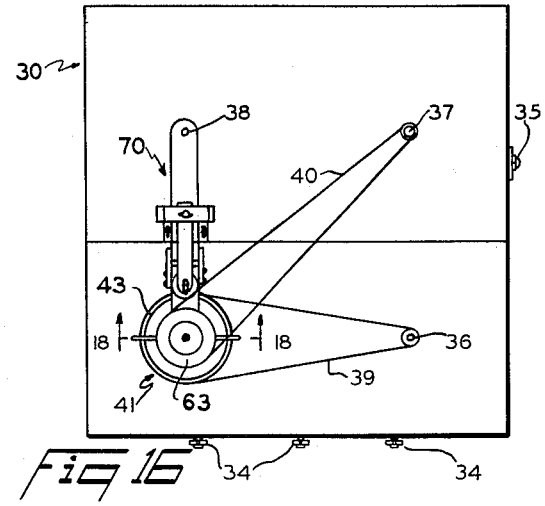
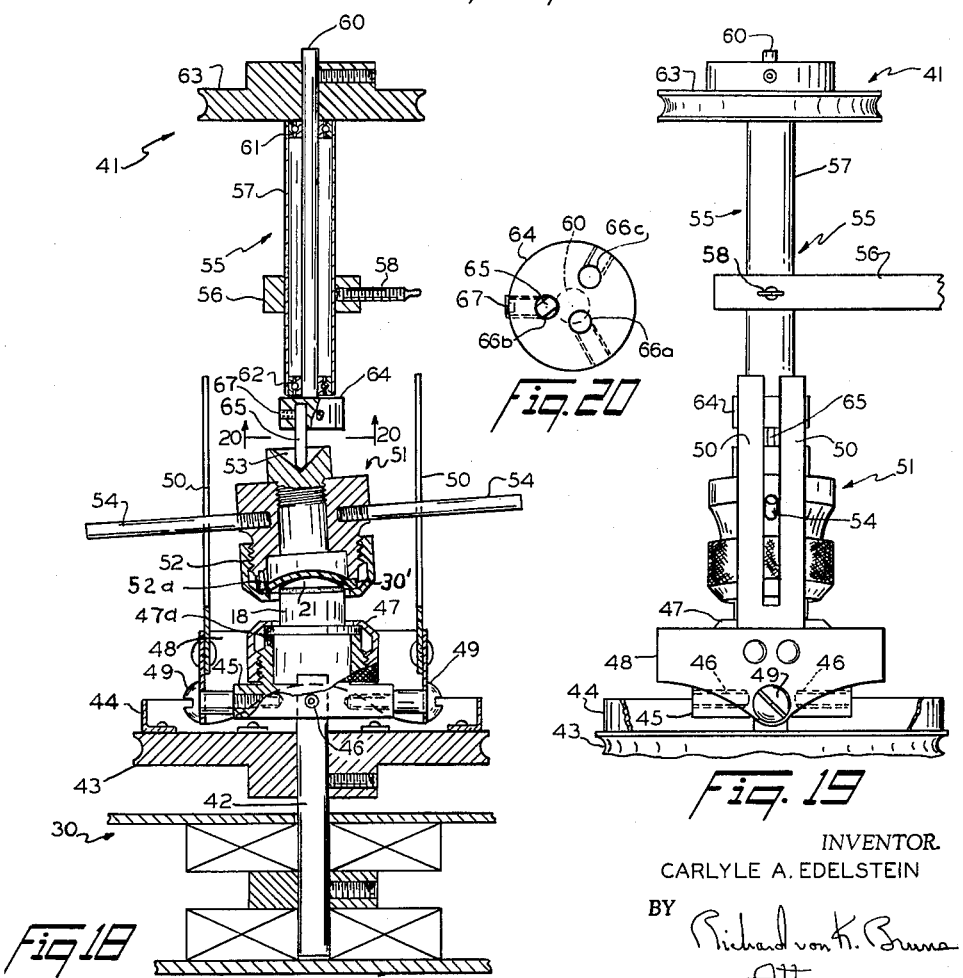
INVENTOR.
CARLYLE A. EDELSTEIN

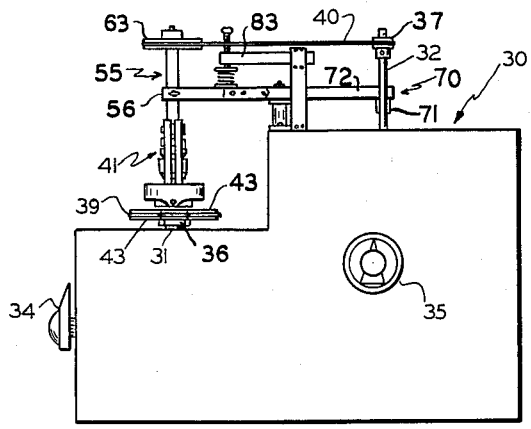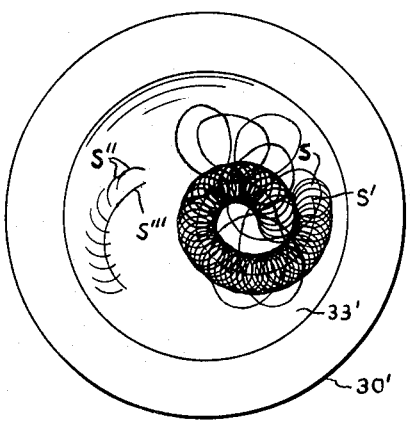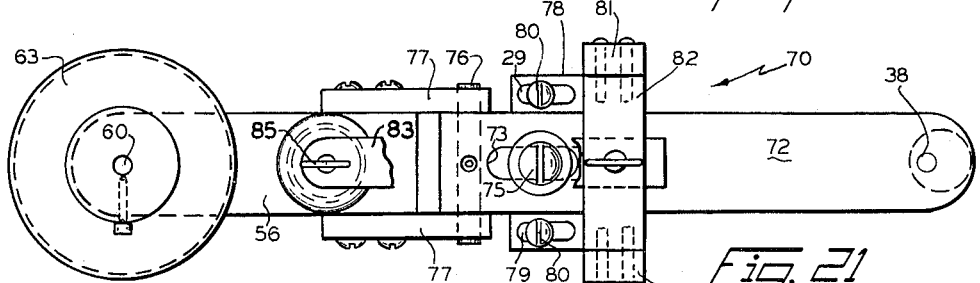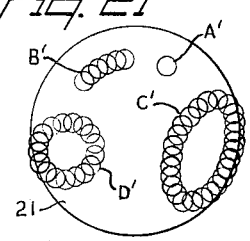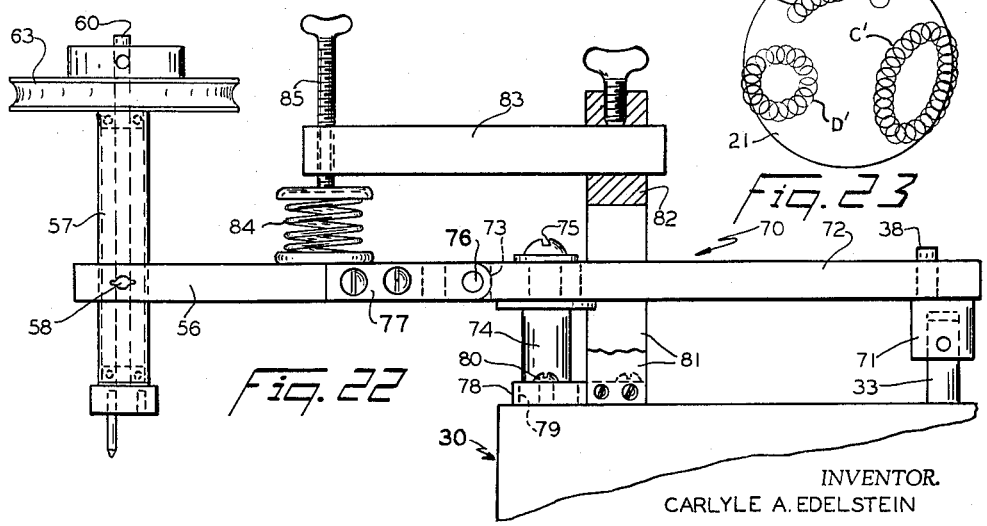

United States Patent Office 3,258,879
Patented July 5, 1966

3,258,879
APPARATUS FOR GRINDING CONTACT LENSES
Carlyle A. Edelstein, 4755 Troop K Road, R.D. 2,
Manlius, N.Y.
Filed Nov. 4, 1963, Ser. No. 321,184
4 Claims. (Cl. 51—124)

This invention relates to a machine for grinding contact lenses using a lap molded from an impression taken of the eyeball.

Contact lenses, including the newer types covering only a portion of the exterior surface of the eyeball, must have their concave inner surfaces shaped in some manner to conform to the actual shape of the eyeball. Heretofore the lens has been ground to conform to an eye shape computed mathematically from measurements, or, since the use of plastic for lenses, by molding the heated lens to a mold formed from an impression taken of the eyeball.

Grinding according to mathematically computed curves is impractical because it is not only impossible to measure accurately the minute hills and valleys of the eye surface but it is also impossible to formulate accurately the very irregular curve of the exterior contour of the eye.

Molding has proved unsatisfactory because, no matter how accurate the original mold is, any plastic has "memory" and changes shape when molded hot and allowed to cool. Also, corrections cannot be made to a molded lens.

An important consideration is the "tear layer" which performs an important function in the modern "corneal" contact lens which covers only the cornea of the eye or a part of the cornea. This tear layer, composed of the tear fluid of the eye, may vary from person to person from about two thousandths to four thousandths of an inch in thickness and should be as even as possible in thickness throughout. The layer of tear fluid has a refraction different from that of the plastic lens, it keeps the lens from contact with sensitive portions of the eyeball, and provides the capillary attraction or suction which, together with the eyelid, holds the contact lens in place. Control of this tear layer thickness is obtained by grinding the edge of the corneal lens with a minute variation between the contour of the edge with the contour of the rest of the lens. This minute variation is impossible to mold or correct in a molded lens and is impractical in a conventionally ground lens due to the impossibility of measuring and controlling the grinding of the complicated curve of the cornea.

The primary object of the present invention, accordingly, is to provide a machine for grinding the concave inner surface of a contact lens so that it will conform minutely to the shape of the eyeball.

Another important object is to provide a machine for grinding the inner surface of a corneal lens with a mold taken from an impression made from the cornea of the eye.

Still another object is to provide means for taking an impression of the cornea and means for molding a lap on which the lens may be ground so that the impression, mold, and lens may be indexed, one from the other, for correctly locating the lens with respect to the eye.

A further object is to provide apparatus for grinding and polishing a contact lens which may be precisely fitted to the eye by regrinding to any extent necessary and which may be duplicated for replacement, if necessary, without refitting.

Other objects and advantages will become apparent from the following description taken in conjunction with the accompanying drawings, in which:

FIGURE 1 is an enlarged plan view of an impression cap according to the invention;

FIGURE 2 is a side elevational view thereof partly in section;

FIGURE 3 is an end elevational view thereof partly in section;

FIGURE 4 is a side elevational view on a smaller scale of a mold taken from the impression of the eye in the cap of FIG. 1;

FIGURE 5 is a greatly enlarged diagrammatic view of the corneal portion of an eyeball with an associated contact lens;

FIGURE 6 is a diagrammatic contour map representation of the eyeball of FIG. 5;

FIGURE 7 is an enlarged side elevational view of a modified form of impression cap;

FIGURE 8 is a plan view thereof;

FIGURE 9 is a side elevational view of a lap and lap holder used in the practice of the invention;

FIGURE 10 is a plan view thereof;

FIGURE 11 is a plan view of a lap mold for a pair of laps;

FIGURE 12 is a side elevational view thereof;

FIGURE 13 is a side elevational view of a lens blank;

FIGURE 14 is a plan view thereof;

FIGURE 15 is a perspective view of a machine for grinding the lens blank according to the invention;

FIGURES 16 and 17 are enlarged plan and side elevational views respectively thereof;

FIGURE 18 is a greatly enlarged fragmentary sectional view on the line 18—18 of FIG. 16;

FIGURE 19 is a fragmentary side elevational view of the part shown in FIG. 18;

FIGURE 20 is a further enlarged sectional view on the line 20—20 of FIG. 18;

FIGURE 21 is an enlarged top plan view of a portion of the machine of the invention;

FIGURE 22 is a fragmentary side elevational view of the parts shown in FIG. 21;

FIGURE 23 is an enlarged plan view of a lap showing diagrammatically the grinding action effected by the various moving parts of the machine; and FIGURE 24 is a greatly enlarged plan view of a lens blank diagrammatically illustrating the path of the grinding action of the lap in its travel over the surface of the lens.

The first step in the invention is the taking of an impression of that portion of the eyeball over which it is desired that the contact lens shall extend. A cup shaped impression cap is substantially filled with molding material and placed in contact with the eye in conventional manner. The molding material is made from ophthalmic "moldite" powder mixed with a liquid to form a thin paste or viscous liquid and which soon hardens at room temperature to a solid of about the consistency of the white of a hard boiled egg, and is thus not irritating to the eye.

Referring more particularly to FIGURES 1–3, the impression cap 10 used for taking the impression comprises an elongated hollow cup portion 11 having a longitudinally extending orienting rib 12 projecting therefrom. The smoothly rounded sidewall of the cup portion has a plurality of passages or holes 13 therethrough extending to the interior or hollow 14 of the cap for carrying off any excess of molding material as the cap is pressed against the eye.

The rib 12 is comparatively narrow and smoothly rounded and the eyelids are closed over the cup portion 11 against the rib when the impression is taken in order to orient the cap over the corneal portion of the eye and hold it in position. One end of the cap may be marked N, as indicated in FIGURE 1, to identify the nasal side of the impression.

In FIGURE 5, the corneal portion C of an eye is indicated in full line E as a continuous, though compound, curve. In fact, however, every eye has minute hills and valleys extending one way or another and indicated exaggeratedly by the broken line F following the general course of the curve E. This variance from a smooth curved outline is shown in FIGURE 6 where the irregular lines P indicate points of identical "elevation" on the "hill" of the cornea like those shown on a contour map.

Referring again to FIGURE 5, the size of the particular corneal lens may be chosen small, as is the lens L shown in full lines, or larger, as in lens L' shown in broken lines. The size may be chosen to avoid areas of great variance from the norm or for other reasons. Whether a lens is large or small there should always be a space T between lens and eye for the tear layer.

In FIGURES 7 and 8, a modified form of cap 10', having a rib 12', is provided with a stem 15 projecting from the rib for more easily grasping the cap when taking the impression. The stem 15 is hollow having a passage 16 therethrough, also for carrying off excess molding material. The stem is substantially no wider than rib 12' and may be oval as shown in FIG. 8.

Caps 10 or 10' may, of course, be provided in a variety of sizes according to the size of the impression to be taken.

After the impression in ophthalmic molding material has hardened, the second step is to make a mold 17 (FIG. 4) from the impression. Dental stone is used for this mold and it may be poured in liquid state into the impression and it quickly hardens at room temperature to a tough and solid state faithfully reproducing in the male mold the contours of the female impression in the ophthalmic molding material.

This mold 17 may be impregnated with an acrylic plastic material and secured to a lap support as shown at 18 in FIGURES 9 and 10. Intermediate steps between the mold and lap, however, have proved to be more effective.

A box-like female mold holder 19, as shown in FIGURES 11 and 12, is filled with silicone rubber material which is initially soft and then sets or "cures" at room temperature to firm but resilient hardness. The male mold 17 is impressed in this material when it is soft and the material is allowed to harden. Preferably, the box 19 is large enough so that impressions 20 may be taken of the molds 17 of both right and left eyes of a single patient. A cover, not shown, may be provided for the box for keeping both molds and impressions permanently.

The next step is to remove mold 17 from the rubber impression and fill the impression 20 with acrylic plastic material which is soft and hardens at room temperature. The resulting male mold is then used as a lap 21 in grinding the lens. It is fixed to the lap support 18, as shown in FIGURES 9 and 10 by securing it thereon with a layer of cement 22.

The lap support 18 has a notch 23 in the flange 24 of the support so that it may be aligned in the grinding machine, as will appear, and the impressions and molds may be indexed with reference to rib 12 of the impression cap. Before the mold 17 is removed from cap 10 a grooved or inked line 25 is drawn across the flat upper surface of the mold as shown in FIGURE 11 and the mold may be marked R or L for right or left eye. The index or axis line 25 is drawn in alignment with, or at a predetermined angle to, rib 12 and index marks 26 along this line may be provided on the cap 10.

When the impression 20 of mold 17 is taken, index marks 27 are made in the rubber material in box 19 in prolongation of the line 25 on the mold. A line or groove 28 on lap 21, similar to the line 25, is made in alignment with marks 27 when the lap is molded and the groove 28 may be extended to be visible at the edges of the lap, as shown in FIGURE 9. The lap support 18 may be provided with lines 29 in alignment with the notch 23 to facilitate the alignment of index mark 28 with the notch when the lap is cemented to the support.

In FIGURES 13 and 14 a plastic lens blank 30' is shown having a flange 31' and index notch 32' similar to the flange and notch of the lap support. The similar flange construction of lap support and lens is advantageous in that similar holders may be provided for lap and lens in the grinding machine hereinafter described. Lens blank 30', it will be noted, is preground with a spherical or cylindrical inner surface 33' and has a convex outer surface 34'.

Referring now to FIGURES 15, 16 and 17, a machine for grinding the inner surface of the lens so that it conforms to the surface of the cornea will be described.

The machine 30 has three drive shafts 31, 32 and 33, powered by a motor or motors not shown. A switch or control 34 at the front of the machine is provided for each drive shaft to start and stop the rotation of the drive shafts, and a timer switch 35 may be provided at the side of the machine to stop the rotation of all three at a predetermined time.

Shaft 31 is provided with a drive pulley 36, shaft 32 with a drive pulley 37, and shaft 33 with an eccentric pin 38, as will appear. Drive belts 39 and 40 connect pulleys 36 and 37 respectively to the bottom and top pulleys of a compound grinding spindle arrangement denoted generally 41, the belt 40 being elastic for reasons which will appear.

Referring now to FIGURES 18 and 19, a freely rotatable spindle or shaft 42 is rotatably supported in machine 30 and projects therefrom. Secured near the upper end of shaft 42 is a pulley 43 driven by belt 39 and having a splash guard 44 secured thereon. Above the pulley a lap supporting platform 45 is secured to shaft 42 by set screws 46 and a lap holder 47, for securing lap 21 and its support 18 in the machine, is threaded on a boss on the platform.

Lens rotating means is provided by a collar 48 tiltably secured to the platform 45 by shouldered screws 49 threaded in the platform at diametrically opposite sides. Collar 48 is thereby rockable on the platform, and a pair of spaced and upwardly projecting arms 50—50 are secured to the collar above each of the pivot screws 49.

The lens blank 30' is secured in an oscillatable floating head or lens block 51 by means of a lens holder 52 threaded thereto so that the inner surface 33' of the blank rests on the lap 21. The head is provided with a conical indentation 53 at the center of the top thereof, and has a pair of diametrically opposite projecting rods or arms 54 secured to the head each of which extends between a pair of arms 50.

Referring again to FIGURE 18, an index pin 47a is provided in the lap supporting platform 45 for engagement in the notch 23 of the lap support to index the lap with respect to the platform. A similar pin 52a is provided in the head 51 for engagement in the notch 32' of the lens blank. The index pin in platform 45 is in radial alignment with one of the pairs of arms 50—50 and the index pin in the head 51 bears the same relation to one of the rods 54. When placing head 51 on the lap 21, care is taken to vertically align the two index pins by engaging the radially aligned rod 54 with the similarly aligned pair of arms 50—50.

Means for oscillating or "wabbling" the head 51 as it rotates in unison with the lap platform 45 is provided by a second spindle arrangement 55 carried on a spindle guide member 56 above the head 51. A hollow shaft 57 is secured to the guide member 56 by a set screw 58. A second shaft 60 is secured within shaft 57 for independent rotation by the ball bearing assemblies 61 and 62, and to the upper end of shaft 60 a pulley 63 is secured which is driven by the elastic belt 40.

The lower end of shaft 60 has a disk 64 secured thereon, and projecting axially downward from the disk is a pointed oscillating pin 65 extending into the indentation 53 of the head. The pin 65 is offset from the axis of shaft 60, as shown in FIGURE 18. Referring to FIG- URE 20, the disk is provided with three axially extending holes 66a, 66b, and 66c, each offset at a different small distance radially from the center of the disk and axis of shaft 60. A radially disposed set screw 67 is provided for securing the pin 65 in the disk in any one of the three holes.

Means for reciprocating the pin 65 in a plane normal to the axis of shaft 60 by carrying the end of guide member 56 in an orbital path about the axis extended of spindle 42 is provided by reciprocating mechanism denoted generally at 70 in FIGURES 21 and 22.

Shaft 33 carries a cap 71 secured thereto and the crank pin 38, secured to the cap, projects upward therefrom axially of the shaft but offset from the axis thereof. Pin 38 extends through a cooperating hole in one end of a connecting member 72 and acts as a crank to reciprocate the member. Member 72 is slotted at 73 and a post 74 supports the member. A shouldered screw 75 passes down through slot 73 to guide the member and secure it on the post.

The other end of the connecting member 72 is provided with a horizontally extending hinge pin 76 which passes through cooperating holes in the hinge members 77 secured to either side of the guide member 56 as shown.

The post 74 is secured to a support plate 78 which is slotted at 79 for the securing screws 80 which secure it to the machine so as to obtain limited adjustment of the post 74 toward or away from shaft 33. The distance between shaft 33 and post 74 preferably is less than the distance between the post and sleeve 57 so that the reciprocating motion of the pin 38 carries shaft 60 in an elliptical orbit.

Secured to plate member 78 on either side of the connecting member 72 are upstanding supports 81 for a bridge member 82 from which a biasing member 83 projects over the guide member 56. A coil spring 84 between members 83 and 56 is provided with an adjusting screw 85 carried on the biasing member to adjustably bias the guide member downward.

In operation, the machine 30 is designed and proportioned for rotation of pulley 43 at a speed of the order of fifty to one hundred revolutions per minute. Pulley 63 is rotated in the opposite direction at a speed of the order of two hundred and fifty to seven hundred and fifty revolutions per minute. Shaft 33, which carries the crank pin 38 is rotated at a slower rate of the order of one hundred revolutions per minute to carry pin 65 in an orbit in the same direction as the pin is revolving around the axis of shaft 60. The optimum speed of rotation of the parts, it will be understood, is dependent on the characteristics of the material used for the lens blank, and the grain size of the grinding powder used, it being desirable to keep vibration to a minimum and to avoid overheating during grinding.

As pulley 43 rotates, the lap platform and lap are rotated therewith. Head 51 is carried bodily in unison with the lap by reason of the arms 54 on the head being interengaged with the arms 50 on the platform 45.

The collar 48, however, may be tilted one way or another on the screws 49 in a first vertical plane normal to a second vertical plane passing through the axis of the screws. The head 51 may be tilted one way or another in this second vertical plane by reason of the arms 54 being free to move up or down between the pairs of arms 50. The head 51, therefore, has a "universal joint" connection with the lap platform 45 and may be tilted about the curved surface of the lap according to the distance the pin 65 is offset at any instant from the axis extended of shaft 42.

The pin 65 may be carried to one side or another of this axis of shaft 42 by reason of its revolution about the axis of shaft 60, or by reason of the sleeve 57 being carried bodily by the guide member 56 in its orbital path about the axis extended of shaft 42. Referring to FIGURE 18, it will be understood that any tilting of head 51 by reason of the pin 65 being offset a small distance to one side or another of the axis extended of shaft 42 will result in a movement of the lens blank 30' with respect to lap 21 that is less than the distance the pin is offset from the axis since the shifting of the lens on the lap is about the curve of the lap.

Lap and lens blank, however, are always in alignment along the lens main axis or along a line across the lens indexed at a predetermined angle to the main axis by reason of the interengagement of arms 50 and 54. This alignment is hereinafter referred to as radial alignment to avoid confusion of lens axis with axis of rotation. The lens may move with respect to the lap either along the main axis of the lens or in any direction due to the aforementioned "universal joint" between lap platform 45 and head 51. As pulley 63 is rotated, pin 65 is carried in a circular path about the axis of shaft 60, hereinafter called the "oscillating" path. This "oscillation" is similar to that described in Patent 1,609,963 to E. G. Robinson, dated Dec. 7, 1926, and results in a circular movement between lens blank and lap.

Shaft 33, as it rotates, carries the crank pin 38 in a circular path and the connected end of the connecting member 72 is carried with the pin. Since member 56 is connected to the connecting member by the hinge members 77, and screw 75 in post 74 guides the connecting member through its engagement in slot 73, the end of guide member 56 connected to sleeve 57 carries shaft 60 and the associated pin 65 in a circular or elliptical path hereinafter called the "orbital" path.

The hinge joint between members 77 and the pin 76 provides freedom of movement of member 56 in the vertical direction, and the adjustable downward pressure on the member 56 exerted by the spring 84 is transmitted to the pin 65. Set screw 58 is provided for adjustment of sleeve 57 in guide member 56 so that the guide member may extend substantially horizontally regardless of the height of lap 21 or thickness of the lens blank 30'. Downward pressure of the spring on guide member 56 and hence on pin 65 is transmitted to the head 51, and the lens blank is thereby biased toward the lap during the grinding process.

Grinding powder or "rouge" of appropriate fineness is applied manually or otherwise between lens and lap during the grinding of the lens and the relative movement between lens and lap grinds the lens to the shape of the lap.

Means for adjustment of the extent or diameter of the oscillating path is provided by moving pin 65 into one or another of the holes 66a, 66b or 66c. An offset distance for pin 65 of the order of one-half to one millimeter has been found successful in grinding corneal lenses of the thirteen millimeter size or diameter.

Means for adjustment of the extent or major axis of the orbital path is provided in the slotted connections 79–80 by which post 74 is secured in the machine. As post 74 is moved away from the sleeve 57, it will be apparent that the elliptical orbital path may be lengthened along its major axis to carry the guide member 56 farther to the right and left as viewed in FIGURE 16. An adjustment from five to ten millimeters across the longest axis of the orbital path has proven satisfactory.

Referring now to FIGURE 23, the revolution of pin 65 in its oscillating path imparts a circular grinding motion at any point between lens and lap as illustrated at A'. At the same time all points on the lap 21 in contact with the lens blank trace this circular path against the blank. Successive points on the lap along an arc are illustrated at B', each point tracing a circular grinding pattern on the lens.

At C' a grinding pattern is illustrated as the pin 65 is carried in its elliptical path by the rotation of shaft 33. When the orbital path is circular the grinding path pattern is circular as illustrated at D'.

When, in addition, lens and lap are rotated with pulley 43, it is apparent that a different path and pattern results. As indicated at the right in FIGURE 24, the grinding pattern becomes a series of circular movements S, illustrated without regard to size, between lens and lap which follow an intricate path S' consisting of a series of connected loops without any apparent particular design or sequence as the pin 65 is carried in its orbital path and lens and lap are simultaneously rotated at different speeds.

Different patterns are produced with different relative speeds of rotation of shafts 33, 42 and 60. Rotation of shaft 33 at about 100 r.p.m., shaft 42 at about 50 r.p.m., and shaft 60 at about 750 r.p.m. has been found to produce a satisfactory pattern wherein the relative movement of any point on the lap with respect to an aligned point on the lens is small, and the grinding action at the edge of the lens is carried out at substantially the same speed as at the center of the lens.

It must be pointed out that the path S' and circular movements S represented in FIGURE 24 are not true representations of the path of a particular point on the lens with respect to one point on the lap. Since lap and lens are rotating, the path represents, rather, the movements of pin 65 with respect to the lap. Analysis of the movement of one point on the lens with respect to a single point on the lap indicates that the actual movement is in the form of an irregular closed curve, of minute dimensions across, which approaches a circle or an ellipse according to the actual speeds and adjustments used.

During the grinding of the lens blank, it will also be understood, lens and lap may be in contact for only a portion of any circular movement between the two, producing a series of arcuate cuts on the lens as illustrated at S'' more or less aligned along a curved path S''' as shown at the left in FIGURE 24.

Referring again to FIGURE 5 it will be apparent that a lap, duplicating the shape F of the eye, which moves only a minute distance with respect to a lens L will impress its shape upon the lens by grinding the lap and lens together. Since relative motion of lap and lens is small, each minute protuberance on the lap will produce a corresponding depression in the surface of the lens which is little larger than the protuberance. Since the protuberances vary in angularity only slightly from the general line E of the cornea, the space T between cornea and lens will have a thickness of substantial uniformity.

Machine 30 may also be used to polish the interior surface 33' of the lens after it has been ground.

The impression 20 in the mold holder 19 is again used to mold a polishing lap or pad. The polishing pad is not shown as it is molded precisely like the lap 21, except that polishing pitch is used to make the pad instead of plastic. The pad is secured to lap holder 18 and inserted in the machine just as was the lap 21 as described above. The blank 30' is polished by "grinding" against the pad in the machine as described above, using polishing powder instead of the grinding powder.

After the lens blank surface 33' is ground and polished, the outer surface 34' is ground by conventional means to give the lens the required optical properties. Alternatively, in exceptional cases, an optical surface may be ground at the center of the inner surface 33'. The lens is then edged by cutting away the flange 31' in an edging machine, and the edge of the ground and polished surface 33' is finished to give the lens L the desired bevelled contour at its edge. The thickness of the tear layer T is controlled by extending the bevelled edge of the lens away from the center of the lens or by shortening the edge to reduce the size of the lens.

Regrinding of a finished lens L may be accomplished by using the same lap 21 in machine 30 and using a slightly modified lens holder which forms no part of the present invention. Alternatively, a new lap 21 may be molded in the impression 20 in the mold holder 19.

It will now be apparent that there has been provided a method and means for grinding the concave inner surface of a contact lens on a lap formed from an impression taken of the eye. Means have been provided for orienting the impression with respect to the eyelids and for orienting the lap with respect to the impression and the lens with respect to the lap.

Circular motion of the power shafts in the grinding machine is transmitted to the lens and the lap as substantially circular motion and lens and lap are in continual motion with respect to one another, this relative motion being circular and in opposite directions so that there is no dwell or "upending" of the particles of the grinding powder during the grinding operation.

The resulting ground surface of the lens is substantially parallel at all points to the irregular curved surface of the eye and a tear layer of substantially uniform thickness can be maintained between lens and eye.

As will be apparent to those familiar with the art, the invention may be embodied in other specific forms without departing from the spirit or essential characteristics thereof. The embodiments disclosed are therefore to be considered in all respects as illustrative rather than restrictive, the scope of the invention being indicated by the appended claims.

What is claimed is:

1. A machine for grinding the inner curved surface of a contact lens on a lap having a curved surface molded from an impression of the corneal portion of an eye, comprising: means for rotating the lap about an axis normal to the approximate center of the curved surface thereof, a lens block oscillatorily supported in the machine, means to bias the curved surface of the lens against the curved surface of the lap, means for maintaining said block in angularly indexed relation to the lap during rotation of the lap, a first means for oscillating the block bodily in a circular path with respect to the axis of rotation of the lap, the extent of oscillation being a fractional part of the width of the lap, and a second means for oscillating the block bodily in an orbital path over the curved surface of the lap.

2. A machine for grinding the concavely curved surface of a contact lens on a lap having a convexly curved surface molded from an impression of the cornea, comprising: a lap holder mounted for rotation about an axis normal to the approximate center of the curved surface of the lap, a lens block supported by the lap, the curved surface of the lens being biased against the curved surface of the lap, interengaging means connected to said lap holder and block for rotating said block in substantially radial alignment with said lap holder about said axis of rotation, first means for oscillating the block bodily in a circular path with respect to the axis of rotation of the lap, and second means for reciprocating the block in an orbital path over the curved surface of the lap.

3. A machine for grinding the concave surface of a contact lens blank to conform it to the configuration of a lap molded from an impression of the cornea, comprising: a lens holder for the lens blank, a lap holder for the lap, said holders having axes normal to the approximate centers of the grinding and ground surfaces of the held parts, said lap holder being mounted for rotation about its said axis, said lens holder being mounted for surface to surface contact between lens and lap, said holders being interconnected for rotation in substantially radial alignment, means including a shaft and a pin offset from the axis of the shaft for biasing the lens against the lap, said pin engaging said lens holder at a point on the lens holder axis spaced from the lens, support means for said shaft including a lever reciprocatively mounted in the machine for carrying said shaft with its axis parallel to the axis of rotation of said lap holder in an orbital path about the said axis of rotation, means for rotating said lap holder and lens holder in unison, means for reciprocating said lever, and means including a flexible belt for rotating said shaft about its axis.

4. A machine for grinding the concave surface of a contact lens blank to conform it to the curved configuration of a lap molded from an impression of the cornea, comprising: a rotatably mounted lap platform having a lap holder, a floating lens block having a lens blank holder at one end thereof, said holders having axes normal to the approximate centers of the curved surfaces respectively of the lap and lens blank secured therein, said block and platform having interengaging arms for rotating said holders in substantially radial alignment on said platform, a lever reciprocatively mounted in the machine, a lens oscillating shaft rotatably supported by said lever and having an axis of rotation always substantially parallel to said lap holder axis, means for rotating said shaft, an element secured on said shaft and having a pivotal connection with the other end of said block, said element being offset a small fractional part of the width of the lap from said shaft axis, means operatively connected to said shaft for biasing the lens against the lap, and means for reciprocating said lever for bodily moving said block over the curved surface of the lap.

References Cited by the Examiner
UNITED STATES PATENTS

| | | |
|---|---|---|
| 1,272,546 | 7/1918 | Simpson. |
| 1,495,018 | 5/1924 | Girard _____ 51—124 |
| 1,520,662 | 12/1924 | Maynard et al. _____ 51—131 |
| 1,989,939 | 2/1935 | Maynard _____ 51—124 X |
| 2,459,925 | 1/1949 | Curteman _____ 18—5.1 |
| 2,501,190 | 3/1950 | Policoff _____ 18—5.1 |
| 3,015,196 | 1/1962 | Campbell _____ 51—284 |
| 3,032,936 | 5/1962 | Voice _____ 51—124 |
| 3,066,458 | 12/1962 | Catron et al. _____ 51—284 |
| 3,112,581 | 12/1963 | Hoffman _____ 51—105 |

LESTER M. SWINGLE, *Primary Examiner.*

J. L. TATE, *Assistant Examiner.*